3,335,102
RESINOUS COMPOSITIONS OBTAINED BY COPO-
LYMERIZING A PARTIAL ESTER OF A POLY-
HYDRIC ALCOHOL, A MONOCARBOXYLIC
ACID AND AN UNSATURATED DICARBOXYLIC
ACID WITH A VINYL MONOMER
George W. Bussell, Dearborn, and Charles E. Jones,
Wayne, Mich., assignors, by mesne assignments, to
Interchemical Corporation, New York, N.Y., a corporation of Ohio
No Drawing. Filed Mar. 8, 1963, Ser. No. 263,741
12 Claims. (Cl. 260—22)

This invention relates to resinous compositions useful as film-forming materials, and pertains more particularly to the resinous products obtained by copolymerizing a partial ester of a polyhydric alcohol, a monocarboxylic acid and an unsaturated dicarboxylic acid with a vinyl-type monomer.

It has been known in the past that esters of unsaturated dicarboxylic acids and monohydric alcohols can be copolymerized with vinyl monomers. However, the present invention provides an improvement over such previous compositons in that a resinous material is provided which has the characteristic of being internally plasticized. This obviates the necessity for providing external plasticizers. The use of external plasticizers is undesirable from several aspects, notably that such plasticizers migrate after the film has been applied and are otherwise lost, resulting in reduced flexibility of the film upon aging. Additionally, the resinous product of the present invention is compatible with other film-forming resinous materials, such as conventional alkyd resins and amine-aldehyde resins. Vinyl-type polymers, that is, compounds containing the terminal $CH_2=C<$ group, are known to have limited compatibility with such resinous materials. Another advantage of the resinous product according to one embodiment of the present invention resides in the fact that the composition can be heat cured when blended with suitable resins to form clear, hard thermoset coatings.

These advantages of the present invention are obtained firstly by forming a resin which utilizes a polyhydric alcohol which contains at least three hydroxyl groups. At least one of these hydroxyl groups is left unreacted in the formation of the resin. The unreacted hydroxyl group can be subsequently reacted with an amine-aldehyde resin to thereby provide a curable material. Such blends may be cured to form hard, insoluble films. Internal plasticizing is obtained by the preesterification of a portion of the hydroxyl groups of the polyhydric alcohol with an aliphatic monocarboxylic acid.

The resinous material of the invention is prepared by partially esterifying one mole of a polyhydric alcohol (having from three to eight hydroxyl groups) with from one to six moles of an aliphatic monocarboxylic acid. In order to provide for subsequent curing, at least two hydroxyl groups per mole of alcohol should be left unreacted. This product is then reacted with an unsaturated aliphatic dicarboxylic acid to form a partial ester of said acid. This partial ester is then copolymerized with a monomeric vinyl compound. The polymerization is preferably carried out in an organic solvent and in the presence of a free radical forming catalyst.

Suitable polyhydric alcohols are glycerine, trimethylol propane, trimethylol ethane, pentaerythritol, tripentaerythritol and dipentaerythritol.

A wide range of useful aliphatic monocarboxylic acids may be used. The saturated aliphatic acids containing from four to eighteen carbon atoms are useful. Most of the acids occurring in natural oils and fats may be used in the practice of the invention. The preferred acids include those which contain from nine to eighteen carbon atoms. However from a broad standpoint, the useful monocarboxylic acids are of the saturated type and may contain from four to eighteen carbon atoms.

The unsaturated aliphatic dicarboxylic acid may be, for example, maleic acid, fumaric acid, or itaconic acid. The term acid is meant to also include the anhydrides of these acids in the case where an anhydride can be prepared (the anhydride of fumaric acid cannot be formed). The anhydride of maleic acid is particularly desirable because of the ease of compounding this material with the other ingredients of the composition.

Among the monomers which may be polymerized with the partial ester of the dicarboxylic acid are included acrylic acid, methacrylic acid, styrene, vinyl toluene, methyl acrylate, ethyl acrylate, butyl acrylate, isobutyl acrylate, hexyl acrylate, octyl acrylate, methyl methacrylate, butyl methacrylate, ethyl methacrylate, lauryl methacrylate, acrylonitrile, acrylamide and methacrylamide. In general, it is preferred that the monomers utilized contain a single $CH_2=C<$ group in terminal position, and an especially preferred group of monomers includes the esters of acrylic and methacrylic acid.

An epoxide material such as vinylcyclohexene dioxide is desirable for reaction with excessive carboxyl groups. Reduction in the acid value is desirable for improved packaged stability.

One or more of the vinyl monomers may be utilized in the invention. The particular monomer blend depends upon the properties desired in the finished film.

Various solvents may be employed in the polymerization process. Suitable solvents are toluene, the xylenes, acetone, methyl ethyl ketone, methyl isobutyl ketone, amyl acetate, butyl acetate, ethylene glycol mono ethyl and butyl ethers, ethylene glycol mono ethyl ether acetate, and aromatic and aliphatic hydrocarbon mixtures.

The polymerization catalysts employed are the conventional peroxygen catalysts such as benzoyl peroxide, tertiary butyl perbenzoate, and di-tertiary butyl peroxide.

The following examples illustrate in detail the preparation of the resinous compositions of the present invention:

*Example I*

338 gms. of nonoic acid, 131 gms. of tripentaerythritol and 20 gms. of amyl acetate were charged into a three neck flask having a capacity of one liter and equipped with a mechanical stirrer, thermometer, reflux condenser and water trap. Nonoic acid is a nine carbon chain acid and tripentaerythritol has eight hydroxyl groups. The amyl acetate was utilized as an azeotropic agent.

These materials were heated to 230° C. with agitation. The water of reaction was removed by azetropic distillation. After processing for five hours, the acid number of the composition was less than 3.0. At that point, the heat was removed and the reaction mass cooled to 48° C. then 34.5 gms. of maleic anhydride were added and the reaction mass was heated to 72° C. The material was then processed for 15 minutes and subsequently thinned with xylene to a nonvolatile content of 75% by weight.

100 gms. of this solution were then blended with 170 gms. of ethyl methacrylate, 5 gms. of methacrylic acid and 1.2 cc. of tertiary-butyl perbenzoate. For a period of 3 hours, this mixture was then slowly added to a refluxing mixture of 100 gms. of xylene and 100 gms. of amyl acetate. One hour later, 20 gms. of xylene, 16 gms. of vinyl-cyclohexene dioxide and 0.5 cc. of di-tertiary butyl peroxide were added. One hour later, 21 gms. of xylene and 0.5 cc. of di-tertiary butyl peroxide were added. The composition was held at reflux for an additional three hours.

The final composition had a nonvolatile content of 45.4% by weight, a Gardner bubble viscosity of F and an acid number of 9.2 based on the solution.

An enamel was prepared from 65 parts by weight of this polymer, 33 parts by weight of a 60% nonvolatile solution of a melamine resin and 2.5 parts by weight of nonleafing aluminum powder. When applied at a film thickness of 1.5 mils and baked for 30 minutes at 250° F., the Tukon hardness was 6.7 knoops and the 20° gloss reading was 74.

This example illustrates the preferred highest ratio of monocarboxylic acid to alcohol and the preferred largest alcohol functionality. The alcohol, as previously indicated, had eight hydroxyl groups. One mole of the alcohol was esterified with six moles of the fatty acid and one mole of maleic anhydride.

*Example II*

232 gms. of nonoic acid, 123 gms. of dipentaerythritol, 1.0 cc. of triphenyl phosphite and 20 gms. of amyl acetate were charged with a one liter flask equipped as in Example I. These materials were heated to 230° C. and the water of reaction was removed by azeotropic distillation. After three and one half hours of processing, the acid number of the composition was less than 1.0. At that point, the heat was removed and the reaction mass cooled to 50° C. 47.5 gms. of maleic anhydride were added and the temperature was raised to 120° C. and held at this point for 30 minutes. The composition was then reduced with xylene to a nonvolatile content of 75% by weight.

The following ingredients were slowly added over a 3 hour period into a one liter flask containing a refluxing mixture of 100 gms. of xylene and 100 gms. of amyl acetate:

100 gms. of the above 75% nonvolatile ester,
75 gms. of methyl methacrylate monomer,
75 gms. of butyl methacrylate monomer,
25 gms. of styrene monomer,
1.20 cc. of tertiary-butyl perbenzoate.

One hour and twenty minutes after the completion of this monomer addition, a mixture of 19 gms. of xylene, 14 gms. of vinylcyclohexene dioxide and 0.5 cc. of di-tertiary butyl peroxide was added over a 10 minute period. After an additional one hour and twenty minutes, 20 gms. of xylene and 0.5 cc. of di-tertiary butyl peroxide were added. Refluxing was continued for two hours.

The final composition had a nonvolatile content of 46.1% by weight, a Gardner bubble viscosity of G and an acid number of 3.7 on solution. A blend of 65 gms. of the above polymer and 33 gms. of a 60% nonvolatile solution of an amine-aldehyde resin was pigmented with 2.5 gms. of a nonleafing aluminum pigment. When applied at a film thickness of 1.2 to 1.5 mils and baked 30 minutes at 250° F., the Tukon hardness reading was 8.0 knoops and the 20° gloss reading was 69.

This example illustrates the use of an alcohol which is less functional than that used in Example I. Dipentaerythritol has six hydroxyl groups per mole. Also, this example illustrates the use of a blend of three different vinyl monomers.

*Example III*

The following materials were charged into a three liter flask equipped as in the previous example:

272 gms. of pentaerythritol,
640 gms. of nonoic acid,
45 gms. of xylene.

These materials were heated to a temperature of 450° F. and the water of reaction was removed by azeotropic distillation. After processing for three hours and thirty minutes, an acid number of less than 2.0 was reached and the heat was removed. The reaction mass was then cooled to 90° F. and 196 gms. of maleic anhydride were added. The temperature was then raised to 240° F. and held for 30 minutes.

200 gms. of xylene were then heated to reflux in a one liter flask. The following mixture was then added to the flask slowly over a three hour period:

143 gms. of the above partial ester,
77 gms. of ethyl methacrylate,
30 gms. of methyl methacrylate,
1.2 cc. of tertiary-butyl perbenzoate.

One hour later a mixture of 28 gms. of xylene, 36 gms. of vinylcyclohexene dioxide and 0.5 cc. of di-tertiary butyl peroxide was added. After an additional hour, 28 gms. of xylene and 0.5 cc. of di-tertiary butyl peroxide were added. Refluxing was then continued for an additional three hours and a half.

The final composition had a nonvolatile content of 46.5% by weight, an acid number of 7.4 on solution and a Gardner bubble viscosity of less than A.

An enamel containing 65 parts by weight of the above polymer, 33 parts by weight of a 60% nonvolatile melamine resin and 2.5 parts by weight of nonleafing aluminum was then prepared. When applied at a film thickness of from 1.2 to 1.5 mils and baked thirty minutes at 250° F., the Tukon hardness reading was 3.2 knoops and the 20° gloss reading was 52.

This example illustrates the preferred upper limit of the partial ester utilized with the vinyl monomers.

*Example IV*

The following materials were charged into a three neck, three liter flask equipped as in the previous example:

640 gms. of nonoic acid,
360 gms. of trimethylol ethane,
45 gms. of xylene.

These materials were heated to a temperature of 450° F. and the water of reaction was removed by azeotropic distillation. After processing for three hours, an acid number of less than 2.0 was obtained and heating was discontinued. The batch was then cooled to 90° F. and 294 gms. of maleic anhydride were added. The temperature was then raised to 140° F. and held at this point for 45 minutes.

75 gms. of this ester were then blended with 150 gms. of ethyl methacrylate monomer, 25 gms. of styrene monomer, 30 gms. of ethylene glycol monobutyl ether and 1.2 cc. of tertiary-butyl hydroperoxide. Over a three hour period, this mixture was slowly added to a one liter flask containing 200 gms. of refluxing xylene. One hour after the completion of this addition, 10 gms. of xylene and 0.5 cc. of di-tertiary butyl peroxide were added. A like mixture was then added one hour later. Refluxing was continued for three hours.

The final composition had a nonvolatile content of 47.5% by weight, an acid number of 24.6 on solution and a Gardner bubble viscosity of K. A blend of 60 gms. of this polymer and 33 gms. of a 60% nonvolatile melamine resin solution was pigmented with 2.5 gms. of nonleafing aluminum powder. When applied at a film thickness of 1.2 to 1.5 mils and baked 30 minutes at 250° F., the Tukon hardness was 11.2 knoops and the 20° gloss reading was 67.

It will be noted that this example does not include an epoxy material such as vinylcyclohexene dioxide. The example also illustrates the use of a tri-functional alcohol.

*Example V*

The following ingredients were charged into a three neck, three liter flask equipped as in the previous examples:

480 gms. of nonoic acid,
360 gms. of trimethylol ethane,
45 gms. of xylene.

These materials were heated to 450° F. and the water of reaction was removed by azeotropic distillation. After processing for two hours, the acid number was less than 1.0 and the heat was then removed. The batch was cooled to 80° F. and 294 gms. of maleic anhydride were added. The temperature was then raised to 158° F. and held at this point for 30 minutes.

88 gms. of the above ester, 200 gms. of xylene, 157 gms. of ethyl methacrylate monomer, 5 gms. of methacrylic acid, 30 gms. of ethylene glycol monobutyl ether and 1.2 cc. of tertiary-butyl perbenzoate were then charged into a one liter flask and heated to a reflux temperature of 126° C. The mixture was refluxed for four hours during which time the temperature gradually rose to 142° C. At that point, a mixture of 30 gms. of xylene, 40 gms. of vinylcyclohexene dioxide and 0.5 cc. of di-tertiary butyl peroxide was added. One hour later 30 gms. of xylene and 0.5 cc. of di-tertiary butyl peroxide were added. Refluxing was then continued for two and one half hours.

The final composition had a non-volatile content of 47.8% by weight, an acid number of 3.1 on solution and a Gardner bubble viscosity of U. An enamel was prepared comprising 65 parts by weight of the above polymer, 33 parts by weight of a 60% nonvolatile solution of a melamine resin and 2.5 parts by weight of a nonleafing aluminum pigment. When this enamel was applied at a film thickness of 1.2 to 1.5 mils and baked one half hour at 250° F., the Tukon hardness was 7.4 knoops and the 20° gloss reading was 65.

It will be noted that in this example the same polyol used in Example IV was again used. However, less of the aliphatic monocarboxylic acid was used. The resulting esters contained additional hydroxyl groups for cross-linking with the amino-aldehyde resin.

Example VI

The following ingredients were charged into a three neck, one liter flask equipped as in the previous examples:

182 gms. of pentaerythritol,
236 gms. of butyric acid,
25 gms. of amyl acetate.

This mixture was heated to a temperature of 158° C. and the water of reaction was removed by azeotropic distillation. After processing for fourteen hours, the acid number was 20.0. The heat was removed and the batch cooled to 70° C. then 131 gms. of maleic anhydride were added and the temperature was raised to 130° C. where it was held for one hour. The final product was then reduced with amyl acetate to a nonvolatile content of 75% by weight.

100 gms. of this solution were blended with 175 gms. of ethyl methacrylate and 1.2 cc. of tertiary-butyl perbenzoate. This mixture was slowly added over a three hour interval to a one liter flask containing a refluxing mixture of 100 gms. of xylene and 100 gms. of amyl acetate. One hour after the addition was completed, 27 gms. of xylene, 28 gms. of vinylcyclohexene dioxide and 0.5 cc. of di-tertiary butyl peroxide were added. One hour later, 26 gms. of xylene and 0.5 cc. of di-tertiary butyl peroxide were added. Refluxing was continued for two and one half hours.

The final composition had a non-volatile content of 47.2% by weight, an acid number of 4.5 on solution and a Gardner bubble viscosity of E. A mixture of 65 gms. of the above polymer and 33 gms. of a 60% nonvolatile solution of a melamine resin gave a clear hard film when baked 30 minutes at 250° F.

This example illustrates the preparation of an ester based on a short chain monocarboxylic acid. Buytric acid has four carbon atoms per molecule. An acid having a shorter chain does not result in the desired internal plasticization. Additionally, it is difficult to esterify short chain acids because of their low boiling point.

Example VII 25 gms. of the partial ester prepared in Example III were blended with 133 gms. of styrene monomer, 92 gms. of ethyl methacrylate monomer, 0.8 cc. of di-tertiary butyl peroxide, 0.4 cc. of tertiary-butyl perbenzoate and 2.0 cc. of tertiary dodecyl mercaptan. The mercaptan is a chain transfer agent and was used for controlling the molecular weight of the polymer. This mixture was added slowly over a three hour period into a one liter flask containing a refluxing mixture of 100 gms. each of xylene and amyl acetate. One hour following the completion of this addition, 25 gms. of xylene and 0.5 cc. of di-tertiary butyl peroxide were added. One hour later a like mixture was added. Refluxing was then continued for an additional three hours.

The final polymer had a non-volatile content of 50% by weight, an acid number of 4.8 on solution and a Gardner bubble viscosity of V. A blend of 65 parts by weight of this polymer with 33 parts by weight of 60% non-volatile solution of a melamine resin gave a clear, hard film when baked 30 minutes at 250° F.

This example illustrates the lower limit of the partial ester. If less of the ester is utilized with the vinyl monomers, very little cross-linking results and the desired plasticization of the applied film is considerably reduced.

Example VIII

The following ingredients were charged into a one liter flask equipped as in the previous examples:

136 gms. of pentaerythritol,
320 gms. of nonoic acid,
25 gms. of amyl acetate.

These materials were heated to a temperature of 230° C. and the water of reaction was removed by azeotropic distillation. After processing for three hours and thirty minutes the acid number was less than 1.0. The batch was cooled to 170° C. and 116 gms. of fumaric acid were added. The temperature was raised to 200° C. and the batch was processed for 45 minutes at which time the acid number had fallen to 86.0.

75 gms. of this ester were blended with the following ingredients:

100 gms. of xylene,
100 gms. of amyl acetate,
165 gms. of ethyl methacrylate monomer,
10 gms. of methacrylic acid,
1.2 cc. of tertiary-butyl perbenzoate,
2.0 cc. of tertiary-dodecyl mercaptan.

The resulting solution was slightly hazy. It was placed in a one liter flask and heated to a reflux temperature of 128° C. The solution became quite clear at this point. After processing for four hours, a reflux temperature of 138° C. was attained and a mixture of 45 gms. of xylene, 35 gms. of vinylcyclohexene dioxide and 0.5 cc. of di-tertiary butyl peroxide was added. One hour later, at a temperature of 140° C., 40 gms. of xylene and 0.5 cc. of di-tertiary butyl peroxide were added. Refluxing was then continued for two and one half hours.

The final polymer had a nonvolatile content of 42.3% by weight, an acid number of 6.7 on solution and a Gardner bubble viscosity of F. A blend of 65 gms. of this polymer with 33 gms. of a 60% nonvolatile solution of a melamine resin gave a clear, hard film when baked 30 minutes at 250° F.

This example illustrates the use of an unsaturated dibasic acid rather than an anhydride.

Example IX 75 gms. of ester prepared in Example III were blended with 65 gms. of butyl acrylate, 100 gms. of methyl methacrylate, 10 gms. of methacrylate acid and 1.2 cc. of tertiary-butyl perbenzoate. This mixture was added continuously over a period of three hours to a refluxing mixture of 100 gms. of xylene and 100 gms. of amyl acetate. An hour after the completion of this addition, a mixture of 45 gms. of xylene, 35 gms. of vinylcyclohexene dioxide and 0.5 cc. of di-tertiary butyl peroxide was added. One hour later 40 gms. of xylene and 0.5 cc. of di-tertiary butyl peroxide were added. Refluxing was then continued for an additional three hours.

The final product had a nonvolatile content of 47.5% by weight, an acid number of 8.1 on solution and a Gardner bubble viscosity of H. 65 parts by weight of this polymer were blended with 33 parts by weight of a 60% non-volatile solution of a melamine resin and resulted in a clear, hard film when baked 30 minutes at 250° F.

This example teaches the use of an acrylate monomer in addition to the monomers previously illustrated in the examples.

Example X

The following ingredients were charged into a three liter flask:

872 gms. of refined coconut oil,
155 gms. of glycerine,
0.4 gm. of yellow lead monoxide.

The mixture was heated to 230° C. under a blanket of inert gas and held until one part of the glyceride was miscible with four parts of methyl alcohol at room temperature. The heat was then removed and the product was filtered.

The following mixture was added slowly over a three hour period to a one liter flask containing 200 gms. of refluxing xylene:

203 gms. of ethyl methacrylate,
18 gms. of maleic anhydride,
30 gms. of ethylene glycol monoethyl ether acetate,
1.2 cc. of tertiary-butyl perbenzoate.

One hour later, 22 gms. of xylene, 25 gms. of vinylcyclohexene dioxide and 0.5 cc. of di-tertiary butyl peroxide were added. After an additional hour, a mixture of 23 gms. of xylene and 0.5 cc. of di-tertiary butyl peroxide was added. One hour and forty-minutes later, 29 gms. of the coconut monoglyceride prepared in the first step were added. Refluxing was then continued for an additional 30 minutes.

The final polymer had a non-volatile content of 43.9% by weight, a Gardner bubble viscosity of H and an acid number of 16.9 on solution. A blend of the above polymer with an alkyd and a melamine resin was baked 30 minutes at 250° F. and produced a clear, hard film.

As will be noted, this example illustrates a different procedure for reacting the unsaturated dicarboxylic anhydride with the alcohol. The use of glycerine as a polyol and a triglyceride rather than a free acid is also shown.

Example XI

The following ingredients were charged into a one liter flask equipped as in the previous examples:

136 gms. of pentaerythritol,
320 gms. of nonoic acid,
20 gms. of amyl acetate.

These materials were heated to a temperature of 230° C. and processed to an acid number of 2.0. The batch was cooled to 180° C. and 130 gms. of itaconic acid were added. Processing was continued at a temperature of 175° C. until the acid number had fallen to 92.

The following materials were placed in a one liter flask and heated to a reflux temperature of 126° C.:

100 gms. of xylene,
150 gms. of amyl acetate,
75 gms. of the partial ester of itaconic acid prepared above,
175 gms. of ethyl methacrylate,
1.2 cc. of tertiary-butyl perbenzoate.

After three and one-half hours a reflux temperature of 136° C. was attained and a mixture of 20 gms. of xylene, 35 gms. of vinylcyclohexene dioxide and 0.5 cc. of di-tertiary butyl peroxide was added. One hour later 15 gms. of xylene and 0.5 cc. of di-tertiary butyl peroxide were added. Refluxing was continued for an additional three hours.

The resulting polymer solution had a nonvolatile content of 45.3% by weight, an acid number of 2.2 on solution and a Gardner bubble viscosity of G. A film cast from a solution containing 65 parts by weight of this polymer solution and 33 parts by weight of a 60% non-volatile solution of a melamine resin was hard and clear after being baked 30 minutes at 250° F.

This example illustrates the use of itaconic acid as the unsaturated dicarboxylic acid component.

The amine-aldehyde resin utilized in blending with the composition of Examples I–XI was a melamine-formaldehyde resin. However, urea-formaldehyde resins are equally adaptable with the composition. It is believed that the amine-aldehyde resin cross-links with the resinous composition upon the application of heat. In addition to amine-aldehyde resins, under certain conditions, epoxy type resins may be blended with the resinous composition of the invention and will form a thermoset film when properly baked.

Although the various materials utilized in the invention may be used in widely varying proportions, the practical range of the materials to form the partial esters has been found to be as follows:

| | Minimum percent by weight | Maximum percent by weight |
| --- | --- | --- |
| Monocarboxylic aliphatic acid | 26.5 | 78.1 |
| Unsaturated dicarboxylic acid | 4.5 | 41.8 |
| Polyhydric alcohol | 15.7 | 39.6 |

As previously mentioned, it is considered desirable to have at least one unreacted hydroxyl group per mole of polyhydric alcohol in the final partial esters. This provides a means for cross-linking when the material is subsequently blended with a suitable resin and heated. To accomplish this, it may be stated that the requirements of the following formula should be met:

$$mn - p \geqq 2m$$

where $m$ is the number of moles of the polyhydric alcohol, $n$ is the number of hydroxyl groups per mole of alcohol and $p$ is the number of moles of the monocarboxylic acid. However, a useful product is provided even if there is not one unreacted hydroxyl group per mole of alcohol in the final product. Note, for instance, the product of Example IV. In this example, three moles of trimethylol ethane and four moles of nonoic acid were used. Trimethylol ethane has three hydroxyl groups per mole, making a total of nine hydroxyl groups. Thus, two moles of the alcohol would have two unreacted hydroxyl groups but the other mole would have only one unreacted group. Upon subsequent reaction with the maleic anhydride, two of the moles would have one unreacted hydroxyl group while the third mole would have no unreacted groups. This means that under normal conditions, there would be incomplete cross-linking with the melamine resin. However, the partial cross-linking which did occur produced a useful film. Additionally, a useful, improved product is provided even if there is no cross-linking. This last statement derives from the fact that the pre-esterification of the resin results in desired internal plasticizing.

The partial esters of the invention can be blended in amounts of from 10% to 50% by weight of the blend with a vinyl monomer mixture. The amount of styrene or vinyl toluene, if used, should be restricted to seventy percent of the materials containing the $CH_2{=}C{<}$ group. Gelation problems are encountered if higher percentages of these materials are used. Vinylcyclohexene dioxide does not have to be used, however, where it is used it is used in an amount up to as high as 15% by weight. Preferably the moles of vinylcyclohexene dioxide added should not exceed the number of unreacted carboxyl groups.

Having thus described our invention, we claim:

1. The method of preparing a resinous composition comprising an interpolymer of from about 10 to 50% by weight of (a) a partial ester of a polyhydric alcohol having from 3 to 8 hydroxyl groups, an aliphatic saturated monocarboxylic acid having from 4 to 18 carbon atoms per molecule, and a monoethylenically unsaturated aliphatic dicarboxylic acid, and from about 50 to 90% of (b) at least one other monomer containing a $CH_2=C<$ group, said method comprising the steps of partially esterifying said polyhydric alcohol having from 3 to 8 hydroxyl groups with said aliphatic saturated monocarboxylic acid, which internally plasticizes the composition, having from 4 to 18 carbon atoms per molecule, then reacting this partial ester with said monoethylenically unsaturated aliphatic dicarboxylic acid to form a second partial ester with said dicarboxylic acid, and then copolymerizing the second partial ester with said at least one other monomer containing a $CH_2=C<$ group, said monomer being copolymerizable with said second ester.

2. The method as defined in claim 1 wherein said monoethylenically unsaturated aliphatic dicarboxylic acid is selected from the group consisting of maleic acid, fumaric acid and itaconic acid.

3. The method as defined in claim 1 wherein said monoethylenically unsaturated aliphatic dicarboxylic acid is maleic acid.

4. The method as defined in claim 1 wherein said second partial ester has one unreacted hydroxyl group per molecule.

5. The method of forming a resinous composition comprising an interpolymer of from about 10 to 50% by weight of (a) a partial ester of a polyhydric alcohol having from three to eight hydroxyl groups, and aliphatic saturated monocarboxylic acid having from four to eighteen carbon atoms per molecule, and a monoethylenically unsaturated aliphatic dicarboxylic acid, and from about 50 to 90% of (b) at least one other monomer containing a $CH_2=C<$ group, said method comprising forming a first partial ester of a polyhydric alcohol having from three to eight hydroxyl groups and an aliphatic saturated monocarboxylic acid, which internally plasticizes the composition, having from four to eighteen carbon atoms per molecule, said partial ester having at least approximately two unreacted hydroxyl groups then forming a second partial ester of said first partial ester and a monoethylenically unsaturated aliphatic dicarboxylic acid selected from the group consisting of maleic acid, fumaric acid and itaconic acid, said second partial ester having approximately one unreacted hydroxyl group per molecule, and then copolymerizing said second partial ester with at least ont other monomer containing a $CH_2=C<$ group, said monomer being copolymerizable with said second ester.

6. The method of forming a resinous composition comprising the steps of forming a first partial ester of a polyhydric alcohol having from three to eight hydroxyl groups and an aliphatic saturated monocarboxylic acid, which internally plasticizes the composition, having from four to eighteen carbon atoms per molecule, the ratio of the polyhydric alcohol to the monocarboxylic acid being in accordance with the following formula:

$$mn - p \geqq 2m$$

where $m$ is the number of moles of the polyhydric alcohol, $n$ is the number of hydroxyl groups per mole of alcohol, and $p$ is the number of moles of the monocarboxylic acid, and then reacting said first partial ester with a monoethylenically unsaturated aliphatic dicarboxylic acid selected from the group consisting of maleic acid, fumaric acid and itaconic acid to form a second partial ester, said second partial ester having approximately one unreacted hydroxyl group per molecule, and then copolymerizing the second partial ester with at least one other monomer containing a $CH_2=C<$ group, said monomer being copolymerizable with said second ester.

7. A resinous composition comprising an interpolymer of from about 10 to 50% by weight of (a) a partial ester of from about 15.7 to 39.6% by weight of a polyhydric alcohol, having from 3 to 8 hydroxyl groups, from about 26.5 to 78.1% by weight of an aliphatic saturated monocarboxylic acid, which internally plasticizes the composition, having from 4 to 18 carbon atoms per molecule, and from about 4.5 to 41.8% by weight of monoethylenically unsaturated aliphatic dicarboxylic acid, said partial ester having approximately one unreacted hydroxyl group per molecule, and from about 50 to 90% by weight of (b) at least one other monomer containing a $CH_2=C<$ group, said monomer being copolymerizable with said second ester.

8. A resinous composition as defined in claim 7 wherein said monoethylenically unsaturated aliphatic dicarboxylic acid is selected from the group consisting of maleic acid, itaconic acid and fumaric acid.

9. A resinous composition as defined in claim 8 wherein said aliphatic monocarboxylic acid has from nine to eighteen carbon atoms per molecule.

10. A resinous composition as defined in claim 7 wherein said dicarboxylic acid is maleic acid.

11. A resinous composition as defined in claim 7 further characterized as having a part (b) containing less than about 15% by weight vinylcyclohexene dioxide with the remainder being at least one other monomer containing a $CH_2=C<$ group.

12. A resinous composition as defined in claim 7 further characterized as having a part (b) containing less than about 70% by weight of a material selected from a group consisting of styrene and vinyl toluene, and containing less than about 15% by weight of vinylcyclohexene dioxide, with the remainder being at least one other monomer containing a $CH_2=C<$ group.

References Cited

UNITED STATES PATENTS

| | | | |
|---|---|---|---|
| 2,223,327 | 11/1940 | Light et al. | 260—850 |
| 2,727,870 | 12/1955 | Beavers et al. | 260—22 |
| 2,734,880 | 2/1956 | Ehring et al. | 260—22 |
| 2,823,190 | 2/1958 | Marcis et al. | 260—22 |
| 2,850,469 | 9/1958 | Christenson | 260—22 |
| 2,851,429 | 9/1958 | Petropoulos | 260—21 |
| 2,862,898 | 12/1958 | Chapin | 260—22 |
| 2,877,194 | 3/1959 | Konen et al. | 260—22 |
| 3,039,979 | 6/1962 | Carlick et al. | 260—76 |
| 3,054,763 | 9/1962 | Bolton | 260—22 |
| 3,123,578 | 3/1964 | Kraft | 260—76 |
| 3,173,971 | 3/1965 | Roth et al. | 260—22 |
| 3,198,759 | 8/1965 | Schmidle | 260—22 |

DONALD E. CZAJA, *Primary Examiner.*

LEON J. BERCOVITZ, *Examiner.*

R. W. GRIFFIN, *Assistant Examiner.*